Patented Oct. 30, 1945

2,388,060

UNITED STATES PATENT OFFICE 2,388,060

CERAMIC COMPOSITION

William Henri Hicks, Las Vegas, Nev., assignor of one-third to John E. Gallois, San Francisco, and one-third to Harris Hammond, Los Angeles, Calif.

No Drawing. Application June 19, 1943,
Serial No. 491,557

2 Claims. (Cl. 106—71)

The primary object of this invention is to provide an improved clay product in the nature of a building block, roofing tile, sewer pipe, or like article, which is advantageous with respect to economy, low specific gravity, control of shrinkage, and which has requisite strength against crushing and other stresses, and which will not split when nails and other fastening devices are driven into it.

In arid sections of the Southwestern United States sun-dried adobe bricks have long been a commonly-used building material. These adobe bricks are made from a plastic clay generally referred to in this section of the country as adobe. The adobe is mixed with sand and water and the plastic mass so formed is shaped into bricks and similar articles of manufacture and utilized in the construction of dwellings which usually are of but one story. These adobe bricks have well-known defects, such as lack of durability, uneven shrinkage which results in cracking, and great weight. The great weight of the bricks increases materially the cost of handling and transporting the same. These defects, particularly the defect of weight, are to a large extent overcome by my improved clay product which is made without the use of sand as one of its outstanding features. The weight of a brick embodying my invention is about ½ that of the ordinary or conventional adobe brick. The shrinkage is less and is more uniform and it is superior with respect to both durability and strength.

My invention resides in the improved clay product which may be utilized in any preferred form such as bricks, tiles, sewer pipe, and the like, and in the method of making the same.

A preferred example of the clay product embodying my invention is as follows: I thoroughly mix 100 parts of adobe with 100 parts of calcined, granular perlite. To this mixture 100 parts of cellulose, such as wood pulp are added and mixed with water. The mass is thoroughly commingled in a paddle type mixer or the equivalent, care being taken to avoid as much as possible breaking or crushing the calcined perlite particles. The quantity of water that is added will vary somewhat depending upon the plasticity of the adobe clay used. Sufficient water is added so that the resulting mass may be hand-molded. The parts referred to in the foregoing are by volume.

Perlite is a mineral of igneous origin found in certain parts of Nevada and elsewhere. It is of the nature of obsidian glass almost black in color. For my purposes it is essential that the water content of the perlite be not less than 2½ by volume in order to obtain a good calcined effect. The temperature of calcination may be from 1550° to 2400° F., although a temperature of from 1550° to 1650° is usually sufficient. When the perlite is calcined under these conditions it quickly turns into a highly expanded or puffed white granular powder. The increase in volume is quite great ranging from seven to twenty-one times its original volume. The calcined perlite so obtained is screened through a 40 to 28 mesh screen and used in the manufacture of the clay product obtained from the mixture as above described.

Any type of plastic clay or adobe may be used provided that it has a shrinkage of 1″ per lineal foot, and does not contain more than from 2½ to 3% alkali or alkaline salts. The clay is comminuted to pass through a ¼″ screen.

The clay forms the base of the improved clay product. The calcined perlite serves to decrease its specific gravity and imparts desirable insulating qualities. The cellulose imparts elasticity to the product and serves as a binder. It also toughens the product so that when a nail or like fastening device is driven into it the product will not split or crack.

The clay product is molded into its desired shape and may then be sun-dried. This usually requires ten days in dry climates but may require as much as three weeks. The drying may be hastened by placing the molded articles through a drier heated to approximately 450° F. in which case the drying operation may be completed in twenty-four hours.

The clay product embodying my invention is approximately 50% lighter in weight than the conventional adobe brick made from adobe and clay.

It will be understood by those skilled in the art that the proportions of the ingredients used may vary widely. When the product is to be used as a brick or building block the calcined perlite may range from 20% to 100% of the clay used. The cellulose present may be as low as one-third of the quantity of clay used. Increase in cellulose will increase the elasticity of the block but decrease its strength. Increasing the calcined perlite will not only decrease the specific gravity but also decrease the strength while increasing the insulating quality. Structural elements made in accordance with this invention have a compression strength running from 450 pounds to 1300 pounds per square inch. The tensile and shearing strength runs in the neighborhood of 250 pounds per square inch.

Mortar used in laying building blocks embodying this invention may, if desired, be formed from the same material as the block itself, namely adobe clay, calcined perlite, and cellulose mixed with water to the consistency of ordinary mortar.

Various changes may be made in the steps of the process without departing from the spirit and scope of my invention as claimed.

I claim:

1. The method of making a clay product as a building block, roofing tile, sewer pipe and the like comprising adding from 20 to 100 parts of calcined pulverized perlite to 100 parts of clay and thoroughly commingling the same, and adding thereto a mixture of 30 to 100 parts of cellulose and water, the water being of sufficient quantity to form a plastic mass that may be hand-molded, and drying the product at a temperature not exceeding about 450° F.

2. The method of making a clay product as a building block, roofing tile, sewer pipe and the like comprising adding from 20 to 100 parts of calcined pulverized perlite to 100 parts of clay and thoroughly commingling the same, and adding thereto a mixture of 30 to 100 parts of cellulose and water, the water being of sufficient quantity to form a plastic mass that may be hand-molded, and drying the same at a temperature of 450° F.

WILLIAM HENRI HICKS.